G. T. HOLLIS.
ANIMAL TRAP.
APPLICATION FILED NOV. 10, 1913.
1,102,049.
Patented June 30, 1914.
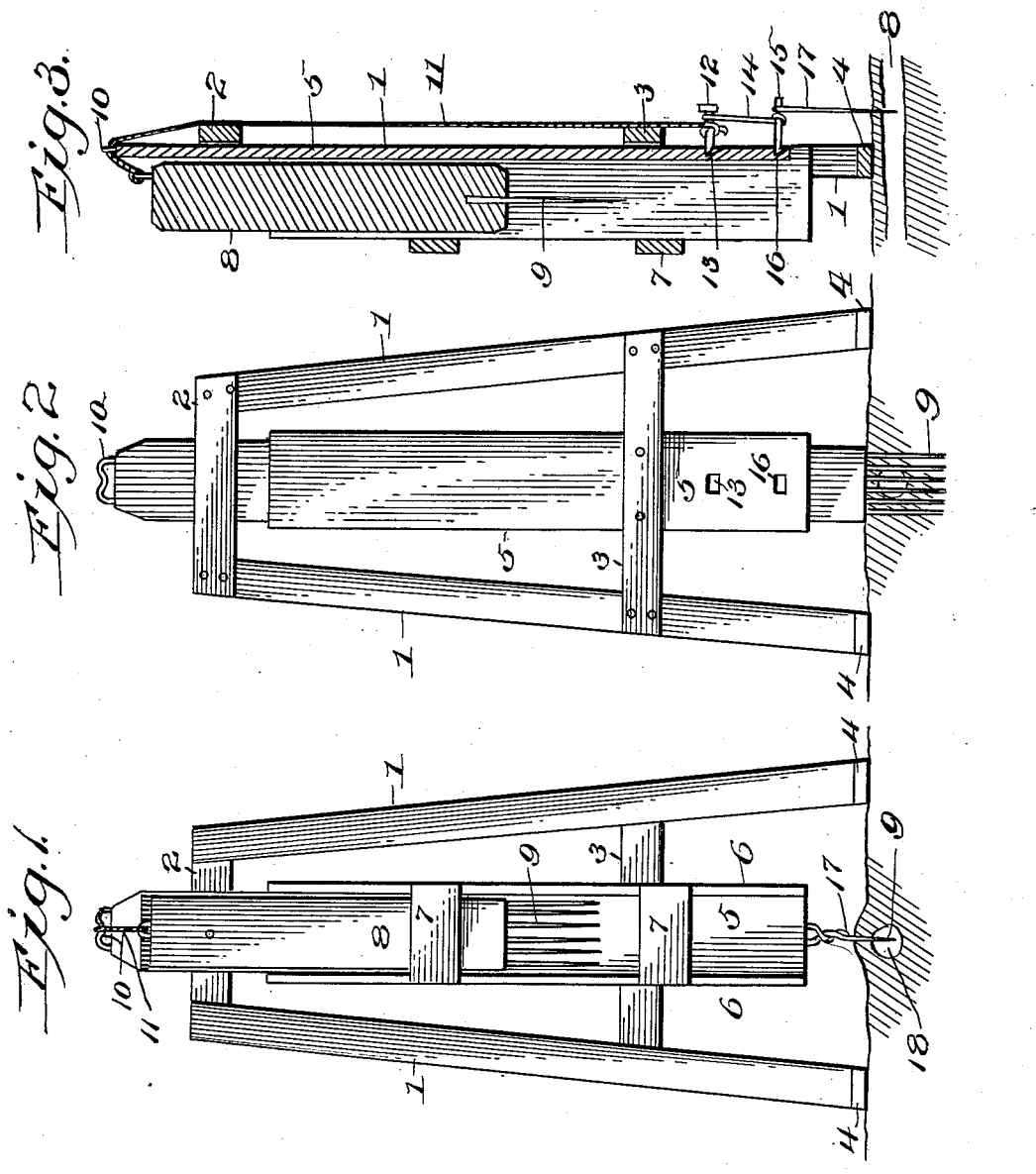

UNITED STATES PATENT OFFICE.

GEORGE T. HOLLIS, OF ANNISTON, ALABAMA.

ANIMAL-TRAP.

1,102,049.  Specification of Letters Patent.  Patented June 30, 1914.

Application filed November 10, 1913. Serial No. 800,146.

*To all whom it may concern:*

Be it known that I, GEORGE T. HOLLIS, a citizen of the United States, residing at Anniston, in the county of Calhoun and State of Alabama, have invented certain new and useful Improvements in Animal-Traps, and do hereby declare the following to be a full, clear, and exact description of the invention, such as will enable others skilled in the art to which it appertains to make and use the same.

My invention relates to certain new and useful improvements in animal traps, and particularly to that type designed to capture moles.

As is well known, the course or run pursued under ground by a mole is indicated by a rise in the surface of the ground, and the object of my invention is to provide a trap adapted to be secured in place over this indication of the course of travel under the surface and to intersect the channel of travel with a trigger which will contact with the head of the blind animal and release a weighted block provided with a series of spears which will pass into the ground and through the body (generally the head) of the mole.

With these ends in view, my invention consists in the details of construction and arrangement hereinafter more particularly set forth.

In order that those skilled in the art to which my invention appertains may know how to make and use my improved trap and appreciate its advantages, I will proceed to describe the same, referring by numerals to the accompanying drawing, in which:

Figure 1 is a rear elevation, showing the trap in a set condition. Fig. 2, a front elevation, showing the trap down and with the trigger mechanism and the cord for holding the dead fall up removed, and Fig. 3 is a central vertical section of Fig. 1.

Similar numerals indicate like parts in the several figures of the drawing.

The frame consists of two converging uprights 1, 1 spaced and secured by top and bottom cross ties 2, 3. This frame is mounted upon parallel foot bars 4.

Arranged centrally of the uprights 1, 1 is a guideway consisting of a back 5 and sides 6. The back extends upwardly beyond the side guides, as clearly shown in Figs. 1 and 2, and is suitably secured in position upon the cross ties 2 and 3. Bridging the sides 6, 6 are arranged two or more flat pieces 7, 7 so that the parts 5, 6, 7 constitute a guideway for a dead fall or block 8 armed at its lower extremity with a series of penetrating spikes 9, which are adapted to impale a mole in the runway when the dead fall descends.

The back 5 of the guideway is provided at its upper extremity with a wire guide 10, over which a cord secured to the upper end of the dead fall 8 passes and is free to run as the dead fall is raised or released. The lower end of the cord 11 is attached to a short pin 12, beveled at its inner extremity and adapted to enter a notch 13 in the back of the guideway, and this pin is connected by a short stiff wire 14 with a second pin 15 similarly beveled and adapted to enter a notch 16 similar to the notch 15 in the back 5. Connected to this secondary pin 15 is a stiff wire 17 adapted to penetrate the earth and intersect the mole runway 18.

From the construction shown and described it will be seen that to set the trap the dead fall is raised to the position shown in Figs. 1 and 3 and the pins 12 and 15 placed in the notches 13 and 16, respectively, and the stiff wire passed down into the runway 18. As the mole traverses the runway under the trap his head will contact with the wire 17, which by vibration will release the pin 15, which in turn will release the pin 12 and the dead fall will by gravity descend and cause the spikes 9 to impale the mole.

The structure as a whole is simple and economic of construction and effective for the purpose for which it is designed.

What I claim as new and desire to secure by Letters Patent is:

In a mole trap, an upright frame, having two converging members adapted to straddle a mole run; a foot member attached to the lower end of each of the converging members and extending parallel with the mole run, and adapted to rest on top of the ground to maintain the frame in an upright position; a vertical dead fall guide way mounted on cross-pieces connecting the converging members at their centers, said guide extending at its upper end above the upper cross-piece, and having mounted in its upper extremity a cord guide; a dead fall adapted to slide in the guide way, having spikes at its lower end, and a cord attaching loop at its upper end, a cord attached to the upper end of the dead fall, and passing over the cord guide, and parallel with the dead fall guide to near its lower end, a pin attached to the lower end of the cord, one end adapted in a horizontal position to rest in a notch in the rear face of the dead fall guide, a link attached at its upper end to said pin and at its lower end to a trigger member consisting of a horizontal portion adapted to rest in a notch in the rear of the dead fall guide beneath the above mentioned notch, and a vertical portion adapted to be inserted into the ground with its lower extremity entering and partly crossing the mole run.

In testimony whereof, I have signed my name to this specification in the presence of two subscribing witnesses.

GEORGE T. HOLLIS.

Witnesses:
CHAS. D. KLINE,
A. F. McGLESE.

Copies of this patent may be obtained for five cents each, by addressing the "Commissioner of Patents, Washington, D. C."